(No Model.)
C. A. DOUGHERTY.
REIN HOLDER.
No. 304,804. Patented Sept. 9, 1884.
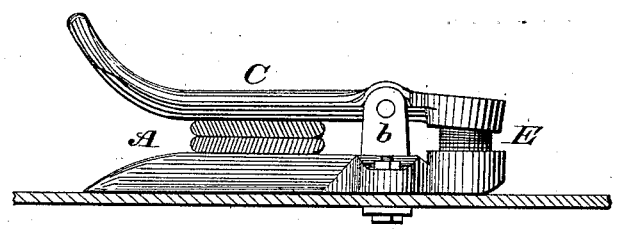
Fig. 1.
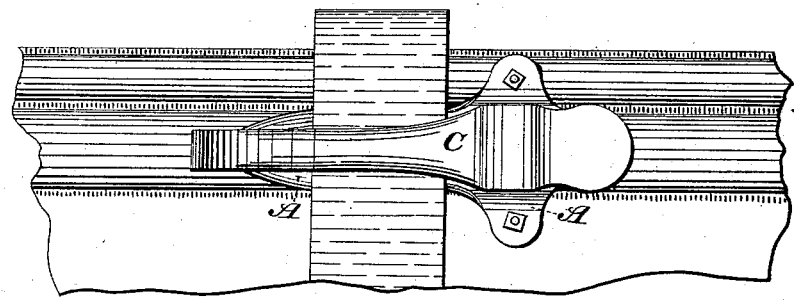
Fig. 2.
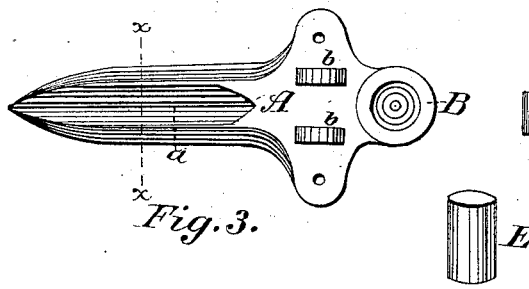
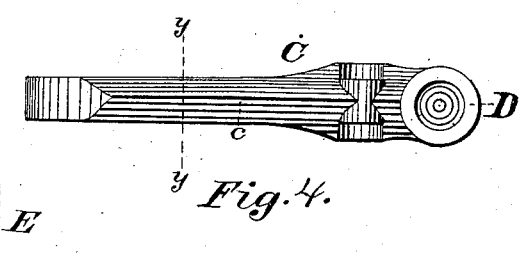
Witnesses:
Geo Bowen
F. M. Bond
Inventor:
Charles A. Dougherty
By Fred M. Bond
Attorney.

UNITED STATES PATENT OFFICE.

CHARLES A. DOUGHERTY, OF CANTON, OHIO.

REIN-HOLDER.

SPECIFICATION forming part of Letters Patent No. 304,804, dated September 9, 1884.

Application filed June 16, 1884. (No model.)

*To all whom it may concern:*

Be it known that I, CHARLES A. DOUGHERTY, a citizen of the United States, residing at Canton, in the county of Stark and State of Ohio, have invented certain new and useful Improvements in Rein-Holders; and I do hereby declare that the following is a full, clear, and exact description of the same, reference being had to the annexed drawings, making a part of this specification, and to the letters and figures of reference marked thereon, in which—

Figure 1 is a side elevation. Fig. 2 is a front view. Fig. 3 is a detached view of post. Fig. 4 is a detached view of arm. Fig. 5 is a detached view of rubber spring. Fig. 6 is a transverse section on line $x\ x$, Fig. 3. Fig. 7 is a transverse section on line $y\ y$, Fig. 4.

The present invention has relation to that class of rein-holders designed to be attached to the dash of a vehicle at any convenient point; and its nature consists in the construction and combination of parts, as hereinafter particularly described and specified.

Similar letters of reference indicate corresponding parts in the drawings.

In the accompanying drawings, A represents the post or frame of the rein-holder, which is substantially of the form shown in the drawings. The top or upper portion of this post is provided with the longitudinal V-shaped recess or crease $a$, the bottom or lower end being provided with the cap or thimble B. This post is also provided with the arms $b$, which are for the purpose of attaching the arm C by means of a bolt or nut in the ordinary manner. The arm C is substantially of the form shown in the drawings, its inner face being provided with the longitudinal V-shaped projection $c$, which is to correspond in size and angle to the recess or crease $a$. The arm C is provided with the cup or thimble D, which is to be opposite to the cup or thimble B, as seen in Fig. 1. These cups or thimbles are for the purpose of receiving the ends of the rubber spring E, as seen in Fig. 1. The rubber spring E is of the form shown in Fig. 5, its diameter being a little larger than the diameter of the cups or thimbles, so that said cups or thimbles will firmly hold said rubber spring in proper position. The strength of the spring may be varied by using different lengths or increasing or lessening the diameter of said spring.

I am aware that rein-holders have heretofore been made having metal springs of different forms and kinds, and hence do not claim broadly.

It will be seen that by forming a rein-holder provided with an india-rubber spring I am enabled to provide a spring that is not liable to get out of order, and at the same time will not be affected by frost, and will be cheap and well adapted for the purpose designed.

I am also aware that it is not new to form a rein-holder of two pivoted jaws having a spiral spring and pin between them at one end and flanges at the other end to one of the jaws to brace the other jaw which fits between them. My invention differs therefrom in forming two cup-shaped recesses at one end of the holder to receive and hold a rubber spring, and a V-shaped projection and a correspondingly-shaped groove at the other end to resist lateral pressure on the jaws and afford a more secure holding of the reins.

Having now fully described my invention, what I claim as new, and desire to secure by Letters Patent, is—

The frame A, formed at one end with a recess, B, and at the other end with a V-shaped groove, $a$, in combination with the arm C, pivoted thereto, and formed at one end with a recess, D, and at the other end with a V-shaped projection, $c$, and a spring, E, interposed between the frame and arm with its ends fitting into the recesses in said parts, substantially as described.

In testimony that I claim the above I have hereunto subscribed my name in presence of two witnesses.

CHARLES A. DOUGHERTY.

Witnesses:
GEO. BOWEN,
FRED W. BOND.